Aug. 6, 1940.   F. BOHLE   2,210,849
RIFLING TOOL
Filed Sept. 23, 1938
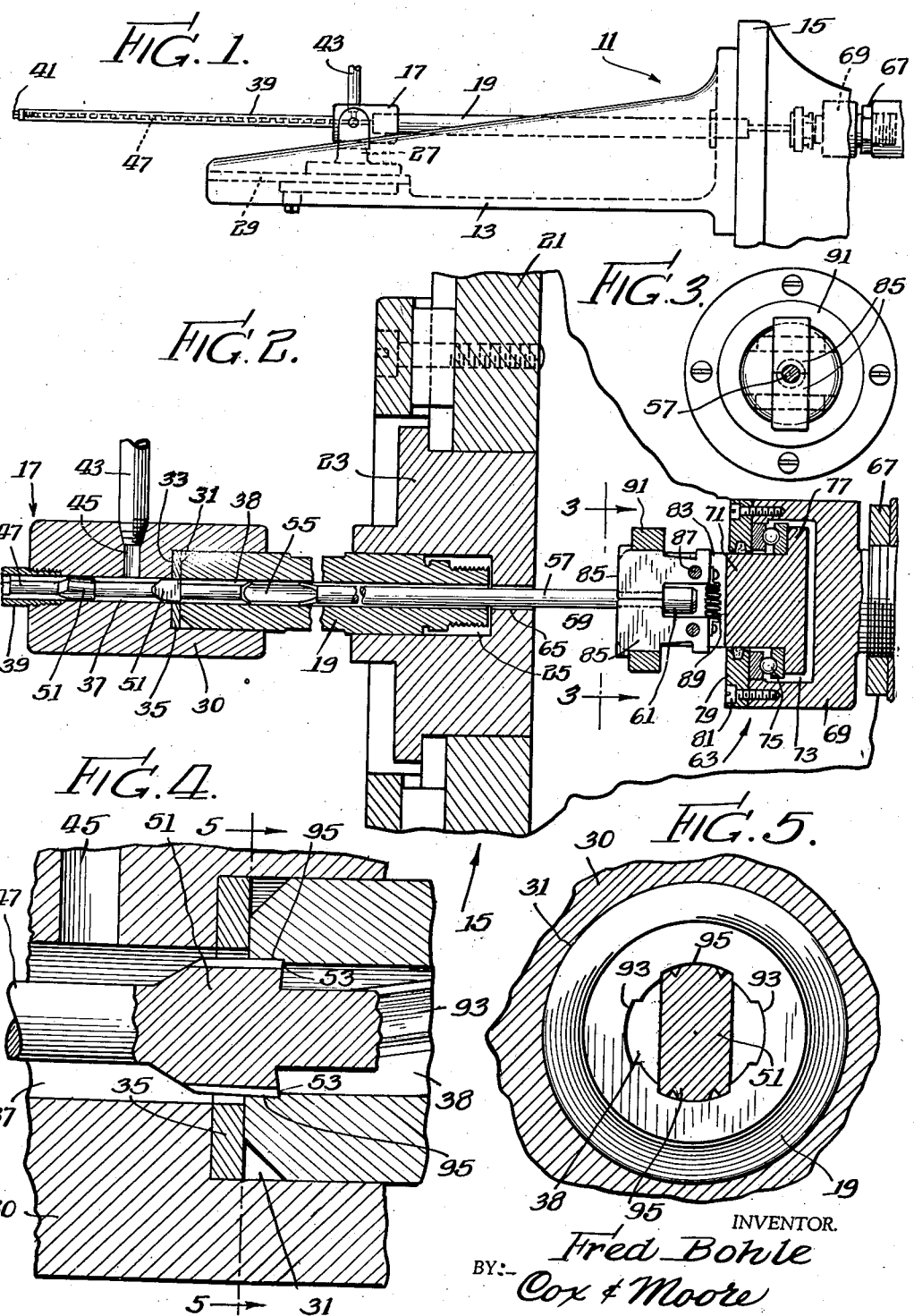
INVENTOR.
Fred Bohle
BY: Cox & Moore
ATTORNEYS.

Patented Aug. 6, 1940

2,210,849

UNITED STATES PATENT OFFICE 2,210,849

RIFLING TOOL

Fred Bohle, Chicago, Ill., assignor to Illinois Tool Works, Chicago, Ill., a corporation of Illinois Application September 23, 1938, Serial No. 231,364

8 Claims. (Cl. 90—28.1)

My invention relates in general to machine tools and has more particular reference to improved apparatus for cutting internal grooves in pipes or tubes, and more especially in gun barrels, to provide rifle grooves.

An important object of the invention is to provide a machine for internally grooving a tube to a desired finished groove depth with a single operating stroke of the machine.

Another important object of the invention is to provide a machine for cutting several grooves, such as rifle grooves, in a tube or barrel, simultaneously, so that the operation may be performed with a single working stroke of the machine.

Another important object resides in providing a rifling machine for gun barrels, including mechanism for drawing a self-rifling tool through the barrel without hampering or interfering with the self-induced turning movement of the tool in the barrel.

Another important object resides in providing a machine of the character mentioned formed with means for delivering a cutting fluid to, into and through a tube or barrel during the groove-cutting operation.

These and numerous other important objects, advantages and inherent functions of the invention will become apparent as the same is more fully understood from the following description, which, taken in connection with the accompanying drawing, discloses a preferred embodiment of the invention.

Referring to the drawing:

Fig. 1 is a side view of a cutting machine embodying my present invention;

Fig. 2 is an enlarged sectional view taken longitudinally through the device shown in Fig. 1;

Fig. 3 is a sectional view taken substantially along the line 3—3 in Fig. 2;

Fig. 4 is an enlarged sectional view showing a portion of the apparatus illustrated in Fig. 2; and Fig. 5 is a sectional view taken substantially along the line 5—5 in Fig. 4.

To illustrate my invention, I have shown on the drawing an apparatus 11 for cutting rifle grooves in gun barrels, although it will be obvious that many features of the invention are not necessarily restricted to the rifling of gun barrels but may be practiced to advantage in longitudinally grooving cylindrical objects, particularly where the grooving has a helical configuration. To illustrate the invention, however, I have shown the same as embodied in an apparatus for cutting helical grooves interiorly within a tubular barrel, as in fabricating a rifle, and it will be seen that I have proposed apparatus to support an object or work piece for grooving by means of a cutting tool adapted to turn itself with respect to the work piece, the tool drawing means of the apparatus being arranged merely to draw the tool longitudinally with respect to the work piece without interfering with the self-induced turning movement of the tool during the operating stroke thereof. This feature is of particular advantage when the invention is applied in the fabrication of rifled gun barrels.

The apparatus 11 comprises a main frame 13 having spaced apart mountings 15 and 17 for supporting a work piece 19, which in the illustrated embodiment comprises a gun barrel. The mounting 15 comprises a support 21 carried by the frame 13 and in turn supporting a mounting block 23 having a cavity 25 for the reception of one end of the work piece 19, which may be, and preferably is, press fitted in the cavity 25. The mounting 17 preferably comprises a pedestal 27 supported for adjustment in a seat or way 29 so that the spacement between the mountings 15 and 17 may be readily adjusted to accommodate work pieces of different lengths. Any suitable or convenient means (not shown) may be provided for securing the pedestal in adjusted position on the way 29. The pedestal 27 preferably carries a mounting block 30 which may be tiltably mounted on the pedestal. The mounting block 30 is preferably formed at one end with a cavity 31 in position to receive the end of the work piece, preferably as a press fit. The bottom of the cavity 31 provides a seat 33 forming an abutment for the end of the barrel, and a resilient packing washer 35 is preferably arranged in the seat to seal the end of the work piece in the cavity. The block 30 is formed with a longitudinal channel 37 communicating the bottom of the cavity 31 with the opposite end of the block, said channel 37 being in alinement with and slightly larger than the bore 38 of the tubular work piece 19.

The block 30 carries a pipe 39 threaded or otherwise secured at one end in the open end of the channel 37, the other end of the pipe 39 being closed by a removable stopper 41. The block 30 also preferably carries a liquid delivery conduit 43 which communicates with the channel 37 through a duct 45 formed in the block for the purpose of delivering a cutting fluid from a suitable source of supply into the channel 37 and thence into and through the bore 38 to afford an adequate supply of cutting fluid during the grooving operation.

The grooving of the barrel or tube 19 is accomplished, in accordance with my present invention, by passing a tool 47 completely through the bore 38 from one end thereof to the other, and it is an important object and feature of my present invention to arrange the cutting apparatus so that the grooving operation may be completed as a result of a single cutting stroke of the tool through the bore 38. To this end I prefer to employ a tool of the character illustrated, described and claimed in my co-pending application, Serial No. 231,363, filed the 23rd day of September, 1938, the same comprising an elongated stem having a plurality of cutter forming enlargements 51 on the stem at spaced intervals and providing cutting edges 53.

The cutter forming enlargements 51 are so shaped that the cutting edges 53 of successive enlargements successively increase the depth of the groove cut in the bore 38 as the tool is drawn therethrough, and the enlargements are formed to provide splines in each head behind the cutting edges thereof, which splines are at an inclination corresponding with the helical inclination of the groove to be cut, whereby the splines follow in the groove behind the cutting edges and impart a turning movement to the tool as it travels the barrel during the cutting operation. The tool is thus constituted as a self-actuated turning element. I do not, however, herein claim any of the features of the tool per se, since the safe forms the subject matter of invention claimed in my aforesaid co-pending application.

At its leading end the tool 47 is formed with a head 55 having a cylindrical portion adapted slidingly and snugly to fit within the bore 38, and a tapered portion adapted to fit into a corresponding socket formed in the end of a draw bar 57. This draw bar preferably comprises a rod of diameter somewhat less than the bore 38, and the socket end of the draw bar is adapted for attachment in any suitable fashion, as by welding, to the headed end of the cutting tool 47. The end of the draw bar opposite its socketed end is formed with a necked portion 59 defining a shouldered head 61.

The tool 47, with draw bar attached, is preferably introduced into the barrel, to groove the same, by removing the stopper 41 from the end of the pipe 39 and inserting the draw bar and attached cutting tool through the pipe 39 and thence through the barrel. Since the draw bar is of less diameter than the bore 38, it may be freely passed therethrough to the position shown substantially in Fig. 2, in which the draw bar and the head 55 of the tool are within the as yet uncut barrel, the leading cutter 51 of the tool being at the end of the barrel in position to commence the grooving operation, the balance of the tool being disposed within the pipe 39 and the channel 37.

To draw the tool 47 through the barrel, I provide traction means 63 adapted for attachment on the head 61 of the draw bar, which head, when the tool has been positioned to commence the cutting operation, projects outwardly of the block 25 through an opening 65 formed therein in line with the bore 38. The traction means 63 comprises a pulling member 67 which may be supported, if desired, on the frame 13 or an extension thereof, for movement in the direction of the axis of the bore 38, and suitable power means (not shown) may be provided to so draw the member 67. The member 67 carries a head 69 in which is journaled for rotation a spindle 71. The head 69 is preferably provided for threaded attachment upon the drawing member 67 and is formed with a cavity 73 for the reception of one end of the spindle 71. In the cavity also is assembled a roller bearing 75 which is mounted between a flange 77 on the enclosed end of the spindle and a cover 79 which closes the cavity and secures the head of the spindle, as well as the roller bearing 75, in place. The cover 79 is secured on the head 69 in any suitable or convenient fashion, as by screw fasteners 81, and the cover is preferably provided with a central opening through which the spindle 71 extends, suitable sealing means being provided to seal the cover opening around the spindle.

Outwardly of the cover, the spindle 71 is formed with a preferably diametral slot 83 in which a pair of cooperating jaws 85 are pivoted, as on pins 87. These jaws, as shown in Fig. 3, are formed to clamp upon the necked portion 59 of the draw bar 57 and to engage behind the shouldered head 61 in order to afford a drawing grip upon the draw bar. These jaws 85 are normally urged toward open bar-releasing position, preferably by means of a spring 89, and a clamping ring 91 is provided on the jaws to retain the same in clamped position. The jaws 85 are formed in their outer edges with cam-like ring-seating surfaces so that when the ring is shifted on the jaws toward the right, viewing Fig. 2, the jaws may open under the influence of the spring 89, but when the ring 91 is in the position illustrated in Fig. 2, it will retain the jaws in draw bar gripping position. The jaws 85, however, are freely turnable with respect to the head and the necked portion 59 of the draw bar, so that the traction means 63 will not hamper or in any way restrict, guide or force the draw bar or otherwise interfere with the self-induced turning movement of the tool 47 during the groove cutting operation.

While I do not necessarily intend to restrict the invention to a machine for cutting rifle grooves, nor to a machine for drawing a cutting tool wherein each of the enlargements 51 comprises a pair of diametrally opposed cutting edges 53, or a tool in which certain of the cutter elements 51 form one groove or groove set, while others of said cutter elements are arranged to form a different groove or groove set, I have however, for the sake of demonstrating the invention, illustrated a tool in which certain of the portions 51 are arranged to cut two diametrally opposite grooves 93, while others of the cutter portions 51 are arranged to form the diametrally opposed grooves 95. It is obvious, however, that each portion 51 may be arranged to form other than a pair of diametrally opposed grooves.

It will be seen from the foregoing description tht the device of my present invention affords a means for cutting a groove in a work piece to a desired depth therein as a result of a single cutting stroke; and that a plurality of helical grooves, as for example rifle grooves, may likewise be formed simultaneously and with one operating stroke of the machine; that where the apparatus is utilized in cutting helical grooves by means of a self-turning tool, the turning movement of the cutter will not be hampered by its connection with the drawing head, since the clamps are freely movable, in an angular direction, with respect to the draw bar and the cutting tool; that the drawing head is of extremely simple construction and arrangement, yet affords quick attachment and detachment of the drawing head from the draw bar and cutter. It will be apparent that the accuracy of the grooves formed on the work piece is not at all dependent upon accurate setting or adjustment of the mechanism, but that the configuration of the grooves is accurately determined by the self-induced rotation of the tool, whereby no accurate adjustment of the tool or the apparatus is required in conditioning the equipment for cutting the grooves, it being merely necessary to insert the draw bar and quickly clamp it to the traction apparatus 63.

The tool drawing mechanism is of simple construction and not at all complicated by mechanism for accurately turning or adjusting the tool as it progresses through the barrel, it being merely necessary to draw the tool, which is self-turning, through the barrel in order to accomplish the grooving operation.

It will also be noted that I have provided means for affording a continuous, adequate flow of cutting fluid to the cutting edges of the tool, and that this flow of fluid is caused to occur in the direction of movement of the tool through the barrel being cut, thereby tending continuously to sweep away from the cutting edges of the tool the chips and other debris resulting from the cutting operation.

It is thought that the invention and its numerous attendant advantages will be fully understood from the foregoing description, and it is obvious that numerous changes may be made in the form, construction and arrangement of the parts without departing from the spirit or scope of the invention or sacrificing its attendant advantages, the form herein described being a preferred embodiment for the purpose of exemplifying my invention.

The invention is hereby claimed as follows:

1. In a machine for internally grooving a tubular work piece by drawing a self turning tool therethrough, the combination, with means for supporting the work piece, of tool drawing means comprising a head mounted for movement in the direction of draw, a spindle mounted for free rotational movement with respect to the head about an axis coincident with the axis of self turning movement of the tool, clamp jaws on said spindle disposed about said axis, and means to hold said jaws in closed position on a tool drawbar portion.

2. In a machine for internally grooving a tubular work piece by drawing a self turning tool therethrough, the combination, with means for supporting the work piece, of tool drawing means comprising a head mounted for movement in the direction of draw, a spindle mounted for free rotational movement with respect to the head about an axis coincident with the axis of self turning movement of the tool, clamp jaws on said spindle disposed about said axis, biasing means normally urging said jaws to open position on said spindle, and means operable selectively to close said jaws and maintain the same in closed position on a tool drawbar portion and to release said jaws for opening movement under the influence of said biasing means.

3. In a machine for internally grooving a tubular work piece by drawing a self turning tool therethrough, the combination, with means for supporting the work piece, of tool drawing means comprising a head mounted for movement in the direction of draw, a step bearing on said head, a spindle freely rotatable in said bearing and having spindle portions extending outwardly of said head, cooperating clamping jaws on said spindle portion in position to close upon a drawbar portion of the tool in alignment with the axis of rotation of said spindle, and means to secure said jaws in closed position on said drawbar portion.

4. A tube grooving machine comprising a frame, supports on said frame for mounting the tube in position to be grooved, one of said supports having a socket for receiving the end of the tube and a channel communicating with the bottom of said socket in line with the bore of a tube mounted on said supports whereby a grooving tool may be passed successively through said channel and the aligned bore of the tube for grooving the latter, said channel having an end opening on a side of the support in which it is formed, and a cover for said open channel end.

5. A tube grooving machine comprising a frame, supports on said frame for mounting the tube in position to be grooved, one of said supports having a socket for receiving the end of the tube and a channel communicating with the bottom of said socket in line with the bore of a tube mounted on said supports whereby a grooving tool may be passed successively through said channel and the aligned bore of the tube for grooving the latter, and means for delivering a fluid to said channel in position to pass through a tube mounted on said supports for grooving, said channel having an end opening on the support in which the channel is formed, and means for sealing said opening during the grooving operation to prevent the escape of said fluid therethrough.

6. A tube grooving machine as set forth in claim 5, wherein the means to seal the open end of said channel comprises a pipe having one end sealed to the open end of the channel, and a removable closure at the other end of said pipe.

7. A tube grooving machine comprising a frame, supports on said frame for mounting the tube in position to be grooved, one of said supports having a socket for receiving the end of the tube and a channel communicating with the bottom of said socket in line with the bore of a tube mounted on said supports whereby a grooving tool may be passed successively through said channel and the aligned bore of the tube for grooving the latter, and means for delivering a fluid under pressure to said channel in position to pass through a tube mounted on said supports for grooving whereby to force the fluid to travel the tube, during the grooving operation, in the direction of movement of the grooving tool, to thereby tend to carry chips cut from the tube by the tool in a direction away from the cutting edges of the tool.

8. A machine for rifling gun barrels, comprising a main frame, spaced supports on said frame for mounting a sleeve-like work piece at its opposite ends in position to be rifled, one of said opposite ends in position to be rifled, one of said supports having a socket for receiving one end of the work piece and a channel communicating with the bottom of said socket in line with the bore of the mounted work piece whereby a grooving tool having a draw-bar portion may be passed successively through said channel and the aligned bore of the work piece to arrange the same with the draw-bar portion projecting from the opposite end of the work piece in position for drawing the tool through the work piece, tool drawing means on said frame at the said opposite end of the mounted work piece in position for connection with the projecting draw-bar portion of a cutting tool thus inserted through the work piece ready for the rifling operation, said drawing means being operable to draw the tool through the work piece, means for closing the end of said channel remote from the held end of the work piece after the tool has been assembled therein to drawing position, and means for delivering a fluid under pressure to said channel in position to pass through the mounted work piece whereby to force fluid through said tube, during the rifling operation, in the direction of movement of the tool through the work piece.

FRED BOHLE.